(12) United States Patent
Urry

(10) Patent No.: US 6,280,877 B1
(45) Date of Patent: Aug. 28, 2001

(54) METHOD FOR PRODUCING AN ELECTRODE CONTAINING ELECTROLYTE-ABSORBED POLYMER PARTICLES

(75) Inventor: Lewis Frederick Urry, Elyria, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/071,521

(22) Filed: May 1, 1998

(51) Int. Cl.[7] ....................................................... H01M 4/62
(52) U.S. Cl. .......................... 429/217; 429/229; 29/623.1
(58) Field of Search ........................... 29/623.1; 429/217, 429/229

(56) References Cited

U.S. PATENT DOCUMENTS

| | | | |
|---|---|---|---|
| 3,884,721 | * | 5/1975 | Tucholski .............................. 136/102 |
| 3,884,722 | * | 5/1975 | Tucholski .............................. 136/102 |
| 5,348,816 | * | 9/1994 | Shinoda et al. ....................... 429/206 |
| 5,401,590 | * | 3/1995 | Chalilpoyil et al. ................... 429/59 |
| 5,587,254 | * | 12/1996 | Kojima et al. ....................... 429/206 |
| 5,686,204 | * | 11/1997 | Bennett et al. ....................... 429/217 |

* cited by examiner

*Primary Examiner*—Carol Chaney
(74) *Attorney, Agent, or Firm*—Stewart A. Fraser

(57) ABSTRACT

A method for producing a gelled anode for alkaline galvanic cells, specifically alkaline zinc-manganese dioxide cells, in which cross-linked electrolyte-absorbed polymer particles are distributed throughout the anode and the gelled anode so made.

9 Claims, No Drawings

METHOD FOR PRODUCING AN ELECTRODE CONTAINING ELECTROLYTE-ABSORBED POLYMER PARTICLES

FIELD OF THE INVENTION

The invention relates to a method for producing improved anodes containing electrolyte-absorbed polymer particles, such as zinc powder-gel anodes, and to galvanic cells employing such anodes.

BACKGROUND OF THE INVENTION

A conventional type of alkaline cell employs a cathode comprising predominantly an oxidic depolarizer such as manganese dioxide usually admixed with a binder and conductive material such as graphite. The anode usually comprises a consumable anodic material such as powder zinc admixed with a gelling agent such as carboxymethyl cellulose, and a suitable alkaline electrolyte such as an aqueous potassium hydroxide solution, and if desired, mercury. Mercury can raise the hydrogen over-potential of the negative electrode zinc surface thereby suppressing the corrosion of the zinc and suppressing the hydrogen gas generation that usually accompanies the corrosion. However, since mercury is harmful to the environment, attempts have been successfully made to eliminate it from batteries. In addition, with the elimination of mercury in the zinc anode, cell stability suffered due to decreased particle-to-particle contact between zinc particles and decreased contact between the zinc particles and the current collector. Also, the occurrence of strong shock to the cell can cause loss of electrical continuity within the anode.

The use of carboxmethyl cellulose, or its derivatives as the binder and gelling agent for anode construction has been satisfactory from a practical commercial standpoint. Unfortunately, however, when conventional alkaline cells generate gas during abuse charge, post discharge and prolong shelf storage, the gas is often entrapped in the anode. This entrapped gas can cause the anode to swell and the internal cell pressure to rise. If no means for gas release are provided, the cell could rupture and thereby present a hazard.

U.S. Pat. No. 3,884,721 discloses an improved composite anode for use in an alkaline-galvanic cell comprising in combination, zinc particles, an alkaline electrolyte and a cross-linked polyacrylamide to form electrolyte nuggets wherein said zinc particles are distributed throughout said composite anode in a manner such that said zinc particles are in contacting relation with said electrolyte nuggets and with each other.

U.S. Pat. No. 5,376,480 discloses a gel form negative electrode of an alkaline battery that is produced without mercury and enabled uniform dispersion of zinc or zinc alloy powder and an effective metal which can be one or more of an oxide or hydroxide of indium, lead, gallium, or bismuth. The zinc or zinc alloy powder and the effective metal are dry mixed in advance of mixing with a gel form alkaline electrolyte. In order to obtain satisfactorily high vibration strength and impact resistance, fiber material can be added to the gel form negative electrode. The fiber material may be selected among rayon, vinylon, acryl, vinyon, polyamide, polypropylene, polyethylene, mercerized pulp, and linter pulp.

U.S. Pat. No. 4,963,447 discloses an alkaline cell having a gelled zinc negative electrode solely or mainly using, as a gelling agent to hold a zinc powder in an alkaline electrolyte, a granular cross-linking type branched polyacrylic acid, polymethacrylic acid or salts thereof. This gelling agent, holding an alkaline electrolyte, swells and properly maintains the thickness of the electrolyte, whereby the electrolyte can be sufficiently fed to a cell reaction portion and the alkaline cell is imparted with excellent drop resistance and shelf stability.

U.S. Pat. No. 5,587,254 discloses a gel type negative electrode comprising a zinc alloy powder, a gelling agent and an alkaline electrolyte which can be improved by using the following three gelling agents in combination in the gel type negative electrode, namely, a cross-linked polyacrylate type water-absorbing polymer having a dispersion viscosity at 25° C. of at least 15,000 cps as a 0.5 wt % aqueous solution and having a particle size of mainly 100–900 microns, a cross-linked and branched type polyacrylic acid or a salt thereof having a dispersion viscosity at 25° C. of at least 15,000 cps as a 0.5 wt % aqueous solution and having a particle size of mainly 100 microns or smaller, and a granular cross-linked and branched type polyacrylic acid or a salt thereof having a dispersion viscosity at 25° C. of at least 15,000 cps as 0.5 wt % aqueous solution and having a particle size of mainly 100–900 microns.

It is an object of the present invention to provide a method for producing an improved gel negative electrode that when used in a galvanic cell will improve the contact between the zinc particles and the contact between the zinc particles and the current collector and will also improve the shock resistance to provide better cell performance especially during pulse discharge under high drains.

It is another object of the present invention to provide a gel-anode using cross-linked polymer absorbed electrolyte particles that are at least 1,000 microns in length, width or height and are distributed throughout the gel-anode.

The foregoing and additional objects will become more fully apparent from the following description.

SUMMARY OF THE INVENTION

The invention broadly relates to a method for producing an electrode for use in a galvanic cell comprising the steps of:

(a) selecting dehydrated liquid absorbing cross-linked polymer particles which are sized to flow through a 20 Tyler mesh screen and be retained on a 200 Tyler mesh screen; and b) mixing at least one electrochemically active material, an electrolyte solution, and the selected liquid absorbing cross-linked polymer particles of step (a), wherein, after absorbing the electrolyte, at least 50% of the liquid absorbing cross-linked polymer particles are at least 1000 microns in length, width or height and are substantially distributed throughout the anode.

In step (b) the cross-linked polymer particles could be contacted with electrolyte prior to the particles being mixed in with electrochemically active material and electrolyte in step (b). Preferably, the liquid absorbing cross-linked polymer particles should be gently mixed into the active material and electrolyte so that the particles can absorb the electrolyte to produce electrolyte-absorbed polymer particles that are at least 1,000 microns in length, width or height. Such particles may be irregularly shaped.

The preferred method for preparing the polymer particles is to gently mix the polymer particles into water, preferably deionized water, making sure that the polymer particles do not form an agglomerate. The mixture, in a gel consistency, is dispensed on a surface where the water absorbed polymer particles are placed in an environment to permit the water to evaporate. Preferably, the water absorbed polymer particles could be placed in a heated vented oven, between 50° C. and 100° C., for a time period sufficient to evaporate the water. The dehydrated polymer particles are first ground and then sorted by passing through a 20 Tyler mesh screen and then selecting those that are retained on a 200 Tyler mesh screen. Preferably, the dehydrated polymer could be sorted by passing through a 20 Tyler mesh screen and selecting those that are retained on a 60 Tyler mesh screen. Most preferably, the dehydrated polymer particles could be sorted by passing through a 40 Tyler mesh screen and selecting those that are retained on a 60 Tyler mesh screen.

Preferably, the dehydrated polymer particles should be gently folded into (gently added to) the active material and electrolyte to insure that at least 75% of the dehydrated polymer particles will absorb the electrolyte and produce electrolyte-absorbed polymer particles that are at least about 1,000 microns in length, width or height. The size of the electrolyte-absorbed polymer particles can vary between about 1,000 microns to about 8,000 microns, preferably between about 2,000 microns to about 6,000 microns and most preferably about 5,000 microns In the preferred embodiment of producing a gelled anode for alkaline cells, the electrochemically active material, such as zinc, is mixed with an electrolyte and a gelling agent and then the dehydrated polymer particles are mixed or folded into the zinc, electrolyte, and gelling agent composition in an amount of between about 15% by volume and about 50% by volume of the total volume occupied by the gelling agent and electrolyte-absorbed polymer particles, preferably between about 20% by volume and about 35% by volume and most preferably about 30% by volume of the of the total volume occupied by the gelling agent and electrolyte-absorbed polymer particles. The absorbed-electrolyte polymer particles substantially retain their swollen state in the anode, such as a zinc powder anode. The electrolyte swollen polymer particles in the anode push the zinc particles together so that the zinc particles are concentrated between the swollen polymer particles forming a matrix type structure that ensures good electrical contact between the zinc particles, and between the zinc particles and the anode current collector. The gelling agent for the zinc-electrolyte composite (pregel) can be the same polymer material as the cross-linked polymer used to produce the electrolyte-absorbed polymer particles except that the polymer particles mixed with the zinc-electrolyte composite is done at a high blending rate so that polymer particles do not effectively absorb the electrolyte and effectively are used primarily as the gelling agent. Other conventional gelling agents used in the battery art can be used as the gelling agent for the pregel anode.

The use of electrolyte swollen polymer particles greater than 1,000 microns in length, width or height has the following benefits:

1. Reduce shock and vibration sensitivity by concentrating the zinc to maintain particle to particle contact. 2. Reservoir for electrolyte:
   a) Holds the electrolyte in the anode and does not allow the electrolyte to migrate to the cathode.
   b) Releases the electrolyte to anode for reaction as needed later in the discharge.
3. Provides gel stiffness to prevent zinc particle movement.
4. May be beneficial to have mixed gelling agents.
5. Improves high rate discharge.

The subject invention also relates to an electrode for use in a galvanic cell comprising an electrochemically active material, electrolyte and cross-linked electrolyte-absorbed polymer particles wherein the particles are at least 1,000 microns in length, width or height and said particles are distributed substantially homogeneously throughout the anode. Preferably, the anode contains a gelling agent and the cross-linked electrolyte-absorbed polymer particles are present in the anode in an amount between about 15% volume and about 50% volume of the total volume occupied by the gelling agent and the electrolyte-absorbed polymer particles.

In general, the cross-linked polymer employed according to the present invention can exhibit the following traits and characteristics:

a. be capable of absorbing the electrolyte and assuming after absorption an expanded or swollen condition;

b. be substantially insoluble in the electrolyte;

c. be stable at the temperatures of use, i.e. it should not release absorbed electrolyte or change physical form at temperature of use;

d. resists chemical degradation in a caustic environment;

e. be capable of absorbing a minimum of about 5 times its weight of electrolyte; and f. as electrolyte-swollen particles should not be extremely gummy or sticky to any significant degree, i.e. there should be no gluing or cementing effect.

Water-insoluble particulate cross-linked polymer of the type herein contemplated are absorbent material that maintains its particulate character as it imbibes and absorbs many times its weight of alkaline electrolyte and in doing so swells. As previously indicated, the absorbent, water-insoluble, particulate cross-linked polymer contemplated herein is capable of absorbing at least about 5 times to 40 times its weight of electrolyte. Consequently, each individual absorbent particle swells or enlarges to several times its initial size without destruction of its initial integrity.

Suitable cross-linked polymers for use in this invention are selected from the group consisting of cross-linked carboxyvinyl polymer, cross-linked polyacrylate polymer and cross-linked polyacrylamide polymer.

Prior to cross-linking, the polyacrylamide absorbent materials for use in the invention may suitably be compounds having the following structural formula:

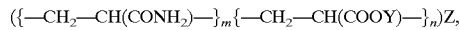

where

Y is hydrogen, ammonium or an alkali metal;

$m$ is a positive number from 1 to 100;

$n$ is 0, or a positive number up to 99 which may be regarded as an index of the degree of hydrolysis of $_m+_n$ amide groups originally present;

$_m+_n$ is equal to 100; and

Z is a number from about 0.1 to 30, where Z times 100 is equal to the number of mer units between cross-links.

The cross-linked polyacrylamide material useful in this invention may be prepared by known techniques, e.g., by cross-linking a linear polyacrylamide or preferably by copolymerizing an acrylamide monomer with non-conjugated divinyl compound. Acrylic acid, methacrylic acid, or salts thereof may be employed with or in place of the acrylamide. The polymerization may be carried out by any of the standard methods including the use of peroxide catalysts, or by photo polymerization with riboflavin activator. The amount of cross-linking compound required to give the desired end product depends on the reactants employed and the conditions of reaction. Examples of non-conjugated, divinyl cross-linking compounds are 1,4-divinyl benzene; N,N-diallylacrylamide; diallylamine; diallymethacrylamide, 2,5-dimethyl-1,7-octadiene; p,p'-diisopropenylbenzene; 2,8-dimethyl-1,8-nonadiene and diethylene glycol divinyl ether, divinyl sulfone, and methylene-bisacrylamide.

Suitable carboxyvinyl polymer material for use in this invention can be formed in the presence of a mixture of polyvalent allyl cross-linking agent with a polyvalent vinyl cross-linking agent, and further granulated. This material is a granular branched carboxvinyl polymer formed by incorporating the above cross-linking agents which are mixed in a suitable mixing ratio, adding soluble solvents such as water, alcohol, etc., during deposition polymerization and forming granular particles from the resultant deposited small particles, or forming particles in the presence of water, alcohol, etc., after the deposition polymerization and granulating the particles.

The cross-linked polyacrylate polymers suitable for use in this invention are polyacrylic acid and polyacrylic salt.

The zinc employed according to the present invention is preferably of the type commonly employed in this art, i.e. in the form of zinc particles or powder. The particles have a size within the Tyler standard screen range of through 60 mesh but substantially retained on 325 mesh. They can be present in the anode in an amount of 30 to 85% by weight preferably 40 to 70% by weight based on the total weight of the ingredients in the anode.

The electrolyte material is an aqueous alkaline metal hydroxide such as sodium hydroxide, potassium hydroxide and the like or mixtures thereof. Potassium hydroxide is preferred. The electrolyte material is present in the anode structure in an amount of 10 to 65% by weight and preferably 25 to 55% by weight based on the total weight of the ingredients in the anode.

Suitable gelling agents for use in the anode of this invention are sodium carboxymethyl cellulose (CMC), methyl cellulose (MOC), poly-N-vinyl pyrrolidone (P-N-V-P), polymethacrylic acid (PMA) or the like. The anodes of this invention are ideally suited for use in alkaline galvanic cells, preferably alkaline-manganese dioxide-zinc system cells.

EXAMPLE

A gelled zinc negative electrode is made of an alkaline electrolyte comprising potassium hydroxide, zinc oxide and water, a gelling agent and a non-amalgamated zinc powder. The zinc negative electrode is prepared as follows: A glass beaker was filled with 400 milliliters of deionized water, with a mixing action at 500–800 rpm. A total of 93.5 grams of Carbopol 940 (trademark of B. F. Goodrich) was added to the water in small amounts while mixing with the water to hydrate. The saturated Carbopol 940 solution had the consistency of jelly. The saturated solution was poured into a stainless steel pan, and placed into a vented 100° C. oven for 24 hours. After the water was fully evaporated, the pan was spotted with dehydrated particles. The dehydrated particles were approximately ¼ inch in diameter and hard. The pan was removed from the oven and cooled. The dehydrated particles were scraped off the pan with a stainless steel putty knife. The dehydrated particles were then placed into a grinder for 10 seconds on high speed. The ground dehydrated particles were then poured through a 40 Tyler mesh size sieve. Any particles that could not pass through the 40 Tyler mesh screen were re-ground until all the particles passed through the 40 Tyler mesh screen and only the particles retained on a 60 Tyler mesh screen were used.

The anode and dehydrated particles were made as follows: A dry blend was used to manufacture anodes that contain pregel anodes and/or dehydrated particles. For an anode with pregel, the dry ingredients of zinc and indium hydroxide are mixed for about five minutes. While the zinc and the indium hydroxide were mixing, a 0.1 N potassium hydroxide solution was fed into the mix. The pregel was thoroughly mixed. The pregel was again mixed for 15 to 20 seconds while sprinkling the 60 Tyler mesh dehydrated particles on top. The anode was aged for one day before use to allow the dehydrated particles to fully hydrate.

The resulting mixture was a gelled anode having electrolyte-absorbed polymer particles greater than 1000 microns in length, width or height, as determined by scanning electron microscopy. The anode containing electrolyte-absorbed polymer particles can be used to make alkaline cells.

It will of course, further be understood that many variations, changes and modifications of the development described herein can be made without departing from the spirit and scope of the invention.

What is claimed:

1. A method for producing an electrode for use in a galvanic cell, comprising the steps of:

(a) selecting dehydrated liquid absorbing cross-linked polymer particles which are sized to flow through a 20 Tyler mesh screen and be retained on a 200 Tyler mesh screen, said cross-linked polymer particles selected from the group consisting of carboxyvinyl polymers and cross-linked polyacrylamide polymers, wherein the liquid absorbing cross-linked polymer particles are made by mixing cross-linked polymer particles with water and then dehydrating the cross-linked polymer particles to produce liquid absorbing cross-linked polymer particles; and (b) mixing at least one electrochemically active material, an electrolyte solution, and the selected liquid absorbing cross-linked polymer particles of step (a), wherein, after absorbing the electrolyte, at least 50% of the liquid absorbing cross-linked polymer particles are at least 1000 microns in length, width or height and are substantially distributed throughout the electrode.

2. A method for producing an electrode for use in a galvanic cell, comprising the steps of:

(a) mixing liquid absorbing cross-linked polymer particles with water and then dehydrating the cross-linked polymer particles;

(b) selecting said dehydrated liquid absorbing cross-linked polymer particles which are sized to flow through a 20 Tyler mesh screen and be retained on a 200 Tyler mesh screen; and (c) mixing at least one electrochemically active material, an electrolyte solution, and the selected liquid absorbing cross-linked polymer particles of step (b), wherein, after absorbing the electrolyte, at least 50% of the liquid absorbing cross-linked polymer particles are at least 1000 microns in length, width or height and are substantially distributed throughout the electrode.

3. The method of claim 2 wherein the water is deionized water.

4. The method of claim 1 wherein step (a) further comprises:

allowing said dehydrated liquid absorbing cross-linked polymer particles to absorb electrolyte thereby producing electrolyte-absorbed polymer particles, and feeding said electrolyte absorbed particles into the mix of step (b).

5. The method of claim 1 wherein in step (a) the dehydrated liquid absorbing cross-linked polymer particles flow through a 40 Tyler mesh screen and are retained on a 200 Tyler mesh screen.

6. The method of claim 1 wherein in step (a) the dehydrated liquid absorbing cross-linked polymer particles flow through a 40 Tyler mesh screen and are retained on a 60 Tyler mesh screen.

7. The method of claim 1 wherein in step (b) at least 75% of the cross-linked electrolyte-absorbed polymer particles are at least 1000 microns in length, width or height.

8. The method of claim 7 wherein in step (b) at least 75% of the cross-linked electrolyte-absorbed polymer particles are between 1000 microns and 10,000 microns in length, width or height.

9. The method of claim 1 wherein in step (b) at least 80% of the cross-linked electrolyte-absorbed polymer particles are between 2000 microns and 6000 microns in length, width or height.

* * * * *